United States Patent

Mahoney, Jr.

[11] Patent Number: 5,722,801
[45] Date of Patent: Mar. 3, 1998

[54] MATERIAL CONVEYING SYSTEM WITH FLOW RATE CONTROL

[75] Inventor: William J. Mahoney, Jr., Williamsport, Pa.

[73] Assignee: The Young Industries, Inc., Muncy, Pa.

[21] Appl. No.: 576,642

[22] Filed: Dec. 21, 1995

[51] Int. Cl.[6] .................................................. B65G 53/04
[52] U.S. Cl. ................................ 406/24; 406/146; 406/192
[58] Field of Search ................................ 406/24, 146, 192

[56] References Cited

U.S. PATENT DOCUMENTS

| | | | |
|---|---|---|---|
| 2,907,605 | 10/1959 | Brooks | 406/24 |
| 4,898,208 | 2/1990 | Nelson | 406/192 |
| 4,917,544 | 4/1990 | Crahan et al. | 406/146 |
| 5,265,983 | 11/1993 | Wennerstrom et al. | 406/24 |
| 5,494,381 | 2/1996 | Heyl et al. | 406/146 |

FOREIGN PATENT DOCUMENTS

| | | | |
|---|---|---|---|
| 2622073 | 7/1977 | Germany | 406/24 |
| 406156728 A | 6/1994 | Japan | 406/146 |
| 1678715 A | 9/1991 | U.S.S.R. | 406/192 |

*Primary Examiner*—Gary C. Hoge
*Attorney, Agent, or Firm*—Lalos & Keegan

[57] ABSTRACT

Particulate material is conveyed in a dense phase in either a batch mode of conveyance or a continuous mode. In either mode, during the conveyance cycle, the flow rate of compressed gas to the transporter vessel is adjusted to control material conveyance. During start-up the flow rate is decreased to allow material to build in the vessel, then the rate is increased to a normal conveyance value. At the end of the cycle, the flow rate is again decreased to avoid surges and high velocity flow. During the normal conveyance cycle, the flow rate is decreased if the material level in the vessel falls below a minimum value and increased if it rises above a maximum value. The flow rate is adjusted by opening and closing the throat in a venturi tube in an adjustable valve in the gas flow line connected to the vessel.

18 Claims, 2 Drawing Sheets

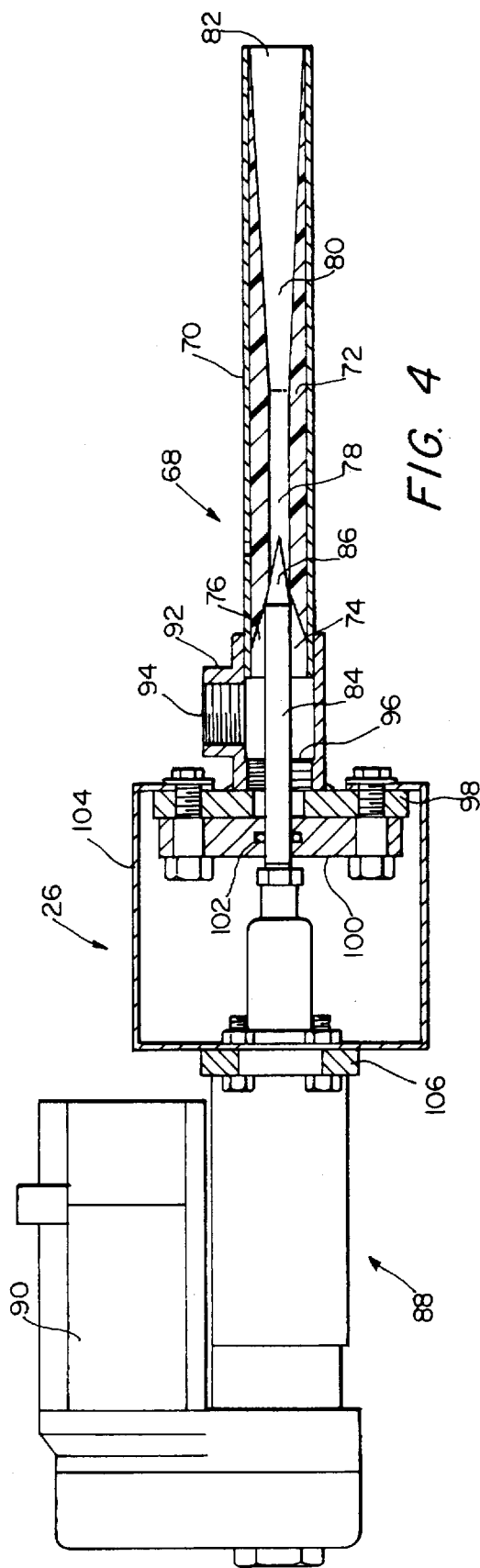
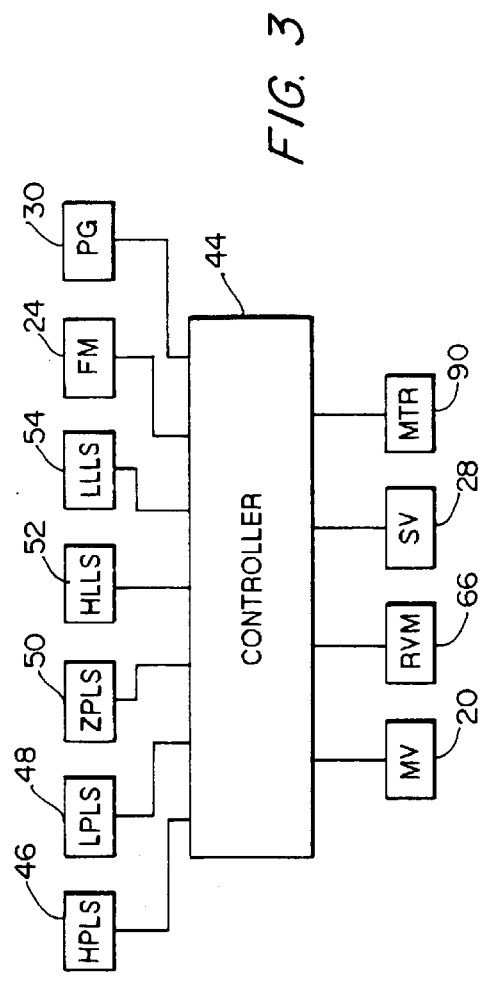
FIG. 4
FIG. 3

5,722,801

MATERIAL CONVEYING SYSTEM WITH FLOW RATE CONTROL

BACKGROUND OF THE INVENTION

The present invention relates to a pneumatic system for conveying particulate materials and more particularly to an apparatus for controlling the flow rate of conveying gas supplied to such a system.

Typically, particulate material is conveyed in either a batch mode in which a fixed volume of material is charged into a transport vessel and then conveyed through a pipeline to a remote site, or in a continuous mode in which the material is fed continuously through a rotary valve into the transport vessel and then through the pipeline, while maintaining a certain material level in the vessel during conveyance.

In the batch mode, a source of pressurized gas is supplied to the conveying pipeline and also to an upper portion of the vessel. Once a batch of material has been charged into the vessel, air or gas is released into the conveying pipeline and at the same time to the upper portion of the vessel. A problem that has been experienced in such system is that the volume of air or gas is released uncontrolled into the pipeline and the vessel, and initially the uncompressed or slightly compressed air or gas conveys the product at a high velocity in the pipeline. The effect of the high velocity of the gas is the degradation of the product being conveyed, vibration and pressure surges in the vessel and convey piping. As the convey line fills with product and the gas compresses, a problem that has been experienced is the product may or may not be conveyed in dense phase or low velocity conveying regime. The uncontrolled volume of gas can cause the material to be conveyed at higher velocities or in dilute phase at end of the piping systems. Many piping systems are designed to convey product to multiple destinations. This presents the problem of having high gas velocity in the shorter systems because of the requirements of the longest piping system. Also, at the end of a conveying cycle, the conveying gas can surge and develop a high velocity.

In the continuous mode of operation, the gas pressurizes as product is loaded into the convey piping. A problem is that the gas leakage increases through the rotary valve as the pressure increases in the conveying system. Current designs use oversized systems to compensate for the compression of the gas but result in conveying at high velocity. Similar to the batch mode of processing, high velocity conditions can result when first starting up the system with uncontrolled gas. Often the gas velocity is high enough that the system does not develop into the dense phase or low velocity regime of conveying the product. Also, at the end of a continuous conveying cycle, the conveying gas can surge and develop a high velocity.

SUMMARY OF THE INVENTION

The present invention addresses the problems encountered in the prior art by controlling the flow rate of gas independent of the downstream pressure and by varying the volume of gas as the conveying system progresses through the different stages of operation: start-up, running, transfer to different use points, emergency shutdown and ending of the conveying cycle with or without line purge. The present invention utilizes the principles of compressible flow theory for convergent/divergent nozzles which hold that the velocity at the narrowest portion of the flow path through the nozzle is equal to the sonic velocity at the local conditions of the gas. Sonic velocity is reached by applying sufficient pressure upstream of the nozzle, and once reached, the rate of gas flow through the nozzle becomes independent of the downstream gas pressure and solely dependent upon the dimensions of the narrowest portion of the gas flow channel.

With sonic velocity flow in the flow channel created by sufficient upstream gas pressure, the rate of gas flow can be predicted by applying the well-known Fliegner's equation, which is, for air at normal temperatures:

$$M = 0.53 \cdot A_t \cdot p_o / \sqrt{T_o}$$

where M is mass flow in pounds per second, $A_t$ is the throat area of the venturi in square inches, $P_o$ is the supply gas stagnation pressure upstream of the venturi in pounds per square inch absolute, and $T_o$ is the supply gas stagnation temperature in degrees Rankine.

Flow rate requirements for pneumatic conveying systems are calculated using known methods. Once the flow rate requirements for a given system are established, then the diameter of the nozzle's throat is calculated from the above equation. The diameter is selected for the maximum flow required for a given system design. Then, by adjusting a throttling valve in the venturi, the venturi throat can be fully opened to provide maximum flow or nearly closed to provide minimum flow, while maintaining a minimum pressure drop through the venturi. The throttling valve can be adjusted between the maximum and minimum set points to any selected intermediate set point to provide flow regulation, as required.

BRIEF DESCRIPTION OF THE DRAWINGS

FIG. 3 is a block diagram representation of a controller and exemplary inputs and outputs utilized in the present invention; and FIG. 4 is a side, partial cross-sectional view of the adjustable choked nozzle of the present invention.

DETAILED DESCRIPTION

Figure 1:
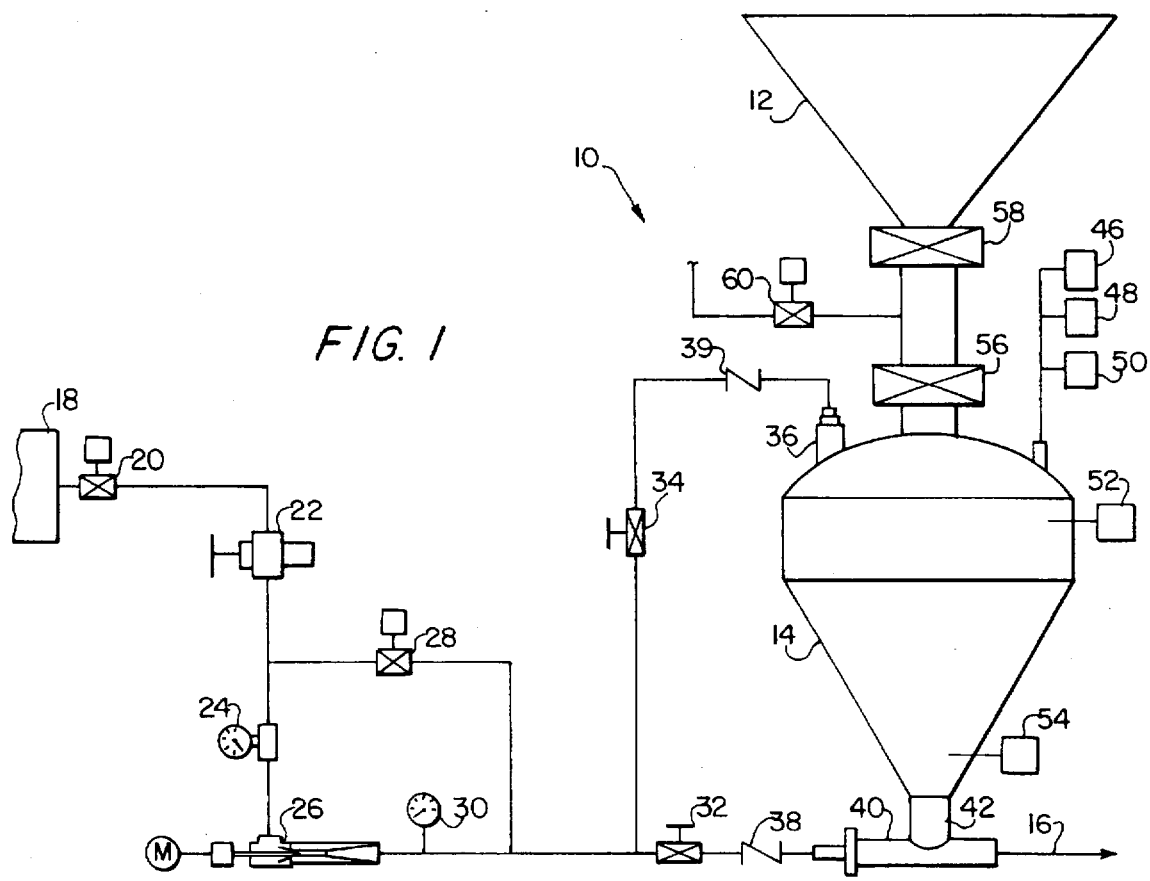
FIG. 1 is a schematic view of a batch conveying system embodying the present invention.

FIG. 1 illustrates a batch conveying system 10 embodying the present invention. Generally, the system includes a product source 12, e.g. a hopper or silo containing particulate material, a transporter vessel 14 in communication with hopper 12 for receiving material therefrom through gravity flow, a pneumatic pipeline 16 for conveying material received from vessel 14, and a source of compressed gas 18. The compressed gas will generally be compressed air having, for example, a gauge pressure of at least 100 pounds per square inch with a sufficient flow capacity for conveying particulate material in a dense phase. In a dense phase, the material is concentrated and the material ahead is propelled forward by the material behind under pressure. This is in contrast to dilute phase conveyance in which the material is carried in the air stream flowing through the conveying line.

Conveying gas passes through a solenoid valve 20, a pressure regulating valve 22, and then is divided into a main flow channel with a gas flow meter 24, an adjustable choked nozzle 26 and pressure gauge 30, and a second, unrestricted flow channel with an electro-pneumatic actuator-driven shutoff valve 28. The unrestricted flow channel rejoins the main channel downstream of nozzle 26. The flow channel again divides into two channels having individual throttling valves 32 and 34 for flow balancing. One of these channels leads through a check valve 39 to intake port 36 near the top of transporter pressure vessel 14, and the second passes through a check valve 38 to a solids-entraining manifold 40 connected to and beneath an outlet 42 of vessel 14.

Material handling apparatus 10 is preferably controlled automatically by a controller 44, shown generally in FIG. 3. Controller 44 may be any conventional programmable computer with an input/output (I/O) interface capable of handling analog and digital sensor inputs and providing analog and digital control outputs. Programming methods and techniques for such commercially available controllers are well known in the art. Once a start sequence is initiated, controller 44 monitors input conditions including, for example, a high pressure limit switch 46, a low pressure limit switch 48, a zero pressure limit switch 50, a high level limit switch 52 and a low level limit switch 54.

Conveying operations begin when the controller 44 enters a run mode, usually initiated by an operator. First, an isolation valve 56 (e.g. a butterfly valve) is opened and then vent valve 60 is opened. Valves 56 and 60 may be controlled and their positions monitored by controller 44; however, for clarity, all input and output connections to/from the controller are not shown. Once the open position of isolation valve 56 is sensed, inlet valve 58 (e.g. a knife valve) is opened. Inlet valve 58 opens to hopper 12 thereby permitting material to gravity flow into vessel 14. In the batch mode of operation, the batch size is controlled by monitoring high level limit switch 52. Once high level switch 52 is activated, inlet valve 58 is closed to prevent further introduction of material. After a time delay, vent valve 60 and then isolation valve 56 are closed. Valve 20, connected to compressed gas source 18, is then opened and conveying begins. Flow balancing valves 32 and 34 are set to provide a pressure differential between vessel 14 and conveying pipeline 16 to achieve a desired flow of material.

As the material in the transporter vessel is conveyed out therefrom, the vessel high level limit switch 52 will be deactivated as the material level drops. After some time, low level limit switch 54 will be deactivated indicating the material level in the transporter has dropped below the level of switch 54. After a delay, gas inlet valve 20 is closed, isolation valve 56 and vent valve 60 are opened and the high pressure air in transporter vessel 14 is vented out to a suitable enclosure, not shown. In-line check valve 38 prevents the high pressure air and material in conveying pipeline 16 from blowing back through vessel 14. Once pressure limit switch 50 indicates zero pressure in vessel 14, vent valve 60 is closed, isolation valve 56 is opened and then inlet valve 58 is opened allowing material to once again gravity feed into vessel 14.

During the conveying cycle, controller 44 monitors various parameters such as vessel pressure through pressure limit switches 46, 48, and 50, line pressure through pressure gauge 30, flow rate through flow meter 24, and the material level in vessel 14 through level limit switches 52 and 54. The adjustable choked nozzle 26 of the present invention will be controlled, preferably automatically by controller 44, to effect conditions during the stages of the conveying cycle, e.g. during start-up, running, shut-down, and when certain conditions are detected by the controller, as will be described in further detail hereinafter.

Figure 2:
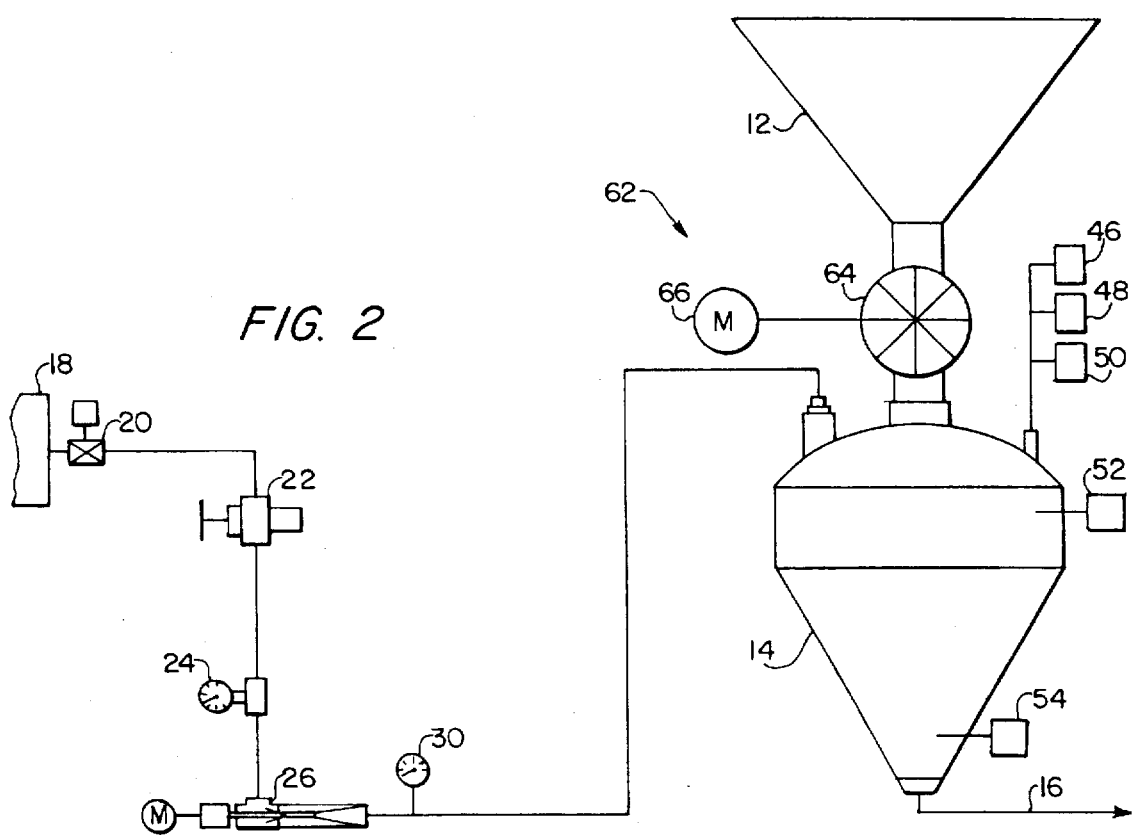
FIG. 2 is a schematic view of a continuous conveying system embodying the present invention.

FIG. 2 illustrates a continuous conveying system 62 embodying the present invention. The continuous mode is similar in many respects to the batch mode and identical system components are labelled with the same reference numbers as in FIG. 1. Generally, in the continuous mode, material is metered into hopper 12 and through a rotary valve 64 into vessel 14. The material is then conveyed by positive pressure into and through pipeline 16. Rotary valve 64 is actuated by a rotary valve motor 66, preferably under control of controller 44. Rotary valve 64 allows a continuous transport of materials by maintaining vessel 14 at least partially filled, between the levels of low level limit switch 52 and high level limit switch 54.

In either the batch mode or continuous mode of material conveyance, in prior systems, the volume of gas used to convey the material is not adjusted during start-up, running or the end of a conveying cycle. As a result, the material can become blocked in the conveying pipeline 16, or the material can sometimes convey at high or uncontrolled velocities. In prior systems, during start-up, the material does not form the desired plug or dune, resulting in a high conveyance velocity. Air surges or high velocities can develop at the end of the conveying cycle.

The present invention overcomes these problems by controlling the flow rate of gas used to convey the material at different stages of the conveying cycle. This flow rate control is implemented with adjustable choked nozzle 26 in the main flow channel. Adjustable choked nozzle 26 is shown in detail in FIG. 4. Nozzle 26 includes a venturi tube 68 having a tubular outer portion 70, preferably formed of metal, and an inner portion 72, preferably formed of polyurethane, providing a cylindrical inlet section 74, a convergent cone section 76, a throat section 78, a divergent cone section 80, and a cylindrical outlet section 82. The diameter of throat section 78 is selected for each particular application of the present invention to meet the maximum flow rate requirement of such application, and in accordance with Fliegner's equation, as discussed above.

The diameter of throat section 78 is adjusted to control the gas flow rate through it by extending or retracting a needle valve 84 having a tapered end 86. The gas flow rate may be controlled in this manner manually, or preferably automatically through a ball screw drive or electric actuator assembly 88. Actuator assembly 88 preferably includes an electric motor 90 connected to and controlled by controller 44. Tube 68 terminates at one end in a coupling 92 that includes a first threaded opening 94 for receiving a cooperating nipple of a gas inlet pipe (FIGS. 1 and 2), and a second threaded opening 96 for receiving needle 84. Tube 68 is connected at its distal end from coupling 92 to a gas outlet pipe of the main flow channel, as shown in FIGS. 1 and 2.

Coupling 92 is secured to a rear flange mounting plate 98, e.g. by welding. Needle 84 is supported in a mounting block 100 with a sealing O-ring 102, and block 100 and plate 98 are mounted together, e.g. by bolts, to a mounting bracket assembly 104. Actuator assembly 88 is secured to bracket assembly 104 by bolts, for example, through front flange mounting plate 106. As best seen in FIGS. 1 and 2, adjustable choked nozzle 26 is placed in the main gas flow path to allow control of the flow rate of the material conveying gas.

The adjustable choked nozzle 26 functions to control the conveying gas flow rate and thereby controls material flow. Consider, for example, the continuous conveying mode. During start-up, as material begins to gravity feed into vessel 14, nozzle 26 is closed to an adjustable start-up position until the pressure in vessel 14 reaches a predetermined conveying pressure, as sensed for example by pressure limit switch 46, and low level limit switch 54 is activated. Then, nozzle 26 is opened to an adjustable middle position. This would complete a normal start-up sequence that allows, if desired, a material plug to form. If, however, low level switch 54 is not activated, the system is shut down and the convey gas volume is adjusted by adjusting the nozzle 26 start-up position. This adjustment could be made manually or programmed into controller 44.

During normal conveying in the continuous mode, the material level stays between the low and high levels, as sensed by limit switches 54 and 52, respectively. If high level limit switch 52 becomes activated, nozzle 26 is opened slightly (not to a fully opened purge position). If, after an adjustable delay, the high level switch has not been deactivated, nozzle 26 is opened slightly more. This process continues until the high level switch is deactivated and then nozzle 26 is returned to its normal conveying position. In this manner, an unintended build up of material in vessel 14 and consequential blockage is avoided.

If during the conveying cycle, low level switch 54 becomes deactivated, nozzle 26 is closed slightly (not to the start-up position). If, after an adjustable delay, the low level switch has not been activated, nozzle 26 is closed slightly more. This process continues until the low level switch is activated and then nozzle 26 is returned to its normal conveying position. In this manner, conveying gas surges and high conveying velocity are avoided. At the end of a conveying cycle, the operator will stop the rotary valve 64 thereby stopping material flow into vessel 14. Low level limit switch 54 will deactivate as the material level in the vessel decreases and low pressure limit switch 48 will be activated. Nozzle 26 will then be slowly opened to a purge position. This prevents conveying gas surges and high conveying velocity at the end of the cycle. To then fully purge the vessel 14 and conveying pipeline 16, the nozzle 26 opens to the full open position.

It will be apparent to those having ordinary skill in the art that nozzle 26 can be controlled to provide advantages in the batch mode of conveyance similar to the exemplary advantages discussed above for the continuous mode, as well as numerous others. Further, it will be apparent that for certain applications, some manual adjustments to certain parameters will be desired while in other applications a fully automated system using controller 44 will be preferred.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An apparatus for conveying particulate materials comprising:
    a transporter vessel including an inlet for receiving materials to be conveyed and an outlet for discharging said materials;
    a conveying pipeline connected to said vessel outlet for receiving materials from said vessel and for conveying said materials;
    a supply of compressed gas;
    a gas flow line connected between said gas supply and said vessel, said gas line including a valve with an adjustable passage therethrough;
    said adjustable valve passage including a venturi tube having a throat;
    said valve further including means for adjustably opening and closing said throat to adjust the flow rate of gas passing through said valve to control material conveyance.

2. An apparatus according to claim 1 wherein said means for adjustably opening and closing includes a needle and means for extending and retracting said needle into and out of said throat, respectively, to close and open, respectively, said throat.

3. An apparatus according to claim 2 wherein said means for extending and retracting includes an actuator and means for automatically activating said actuator.

4. An apparatus according to claim 3 wherein said means for automatically activating includes a motor connected to said actuator.

5. An apparatus according to claim 4 wherein said means for automatically activating includes a controller connected to said motor.

6. An apparatus according to claim 3 wherein said actuator is a ball screw drive actuator.

7. A method for conveying particulate materials comprising:
    charging said materials into a transporter vessel until a level of material in said vessel has been reached;
    introducing compressed gas through a venturi throat having a variable cross sectional area into said vessel to increase pressure in said vessel and to induce material flow from said vessel to a conveying pipeline; and
    adjusting said variable cross sectional area of said venturi throat adjust the rate of flow of said compressed gas introduced into into said vessel to control material conveyance.

8. A method according to claim 7 wherein said step of adjusting includes increasing the rate of gas flow to increase material conveyance after a minimum level of material in said vessel has been reached.

9. A method according to claim 8 further including the step of reducing the rate of gas flow to decrease material conveyance if material in said vessel drops below said minimum level.

10. A method according to claim 8 further including the step of further increasing the rate of gas flow to increase material conveyance if material in said vessel rises above a maximum level.

11. A method according to claim 7 wherein said step of adjusting includes decreasing the rate of gas flow to decrease material conveyance at the end of a conveyance cycle.

12. A method for conveying particulate materials comprising:
    charging said materials into a transporter vessel until a level of material in said vessel has been reached;
    introducing compressed gas into said vessel to increase pressure in said vessel and induce material flow from said vessel to a conveying pipeline; and
    adjusting the rate of flow of said compressed gas introduced into into said vessel to control material conveyance, including reducing the rate of gas flow to slow material conveyance while material is initially charged into said vessel.

13. A method for conveying particulate materials comprising:
    charging said materials into a transporter vessel until a level of material in said vessel has been reached;
    introducing compressed gas through an adjustable valve having a venturi tube into said vessel to increase pressure in said vessel and induce material flow from said vessel to a conveying pipeline;

adjusting the rate of flow of said compressed gas introduced into into said vessel by varying the cross sectional area of a throat in said venturi tube to correspondingly vary said rate of flow of said compressed gas, to control material conveyance.

14. A method according to claim 13 wherein said step of selectively varying further includes automatically activating an actuator coupled to said adjustable valve.

15. A method according to claim 14 wherein said step of automatically activating further includes sending a control signal to a motor coupled to said actuator.

16. A method according to claim 7 wherein said step of adjusting includes reducing the rate of gas flow to slow material conveyance while material is initially charged into said vessel.

17. A method according to claim 7 wherein said step of adjusting further includes automatically activating said adjustable valve.

18. A method according to claim 17 wherein said step of automatically activating said adjustable valve further includes sending a control signal to a motor coupled to said adjustable valve.

* * * * *